United States Patent
Zarka et al.

(10) Patent No.: US 9,026,664 B2
(45) Date of Patent: May 5, 2015

(54) DATA COMMUNICATION SYSTEM AND METHOD

(75) Inventors: Julien Zarka, Vitry sur Seine (FR); Vincent DePhily, Kilkenny (IE); Aaron Solomon, Villejuif (FR)

(73) Assignee: Mobile Devices Ingenierie, Villejuif (FR)

( * ) Notice: Subject to any disclaimer, the term of this patent is extended or adjusted under 35 U.S.C. 154(b) by 178 days.

(21) Appl. No.: 13/634,003

(22) PCT Filed: Mar. 19, 2010

(86) PCT No.: PCT/IB2010/001195
§ 371 (c)(1),
(2), (4) Date: Sep. 11, 2012

(87) PCT Pub. No.: WO2011/114183
PCT Pub. Date: Sep. 22, 2011

(65) Prior Publication Data
US 2013/0007119 A1     Jan. 3, 2013

(51) Int. Cl.
G06F 15/16 (2006.01)
H04J 3/24 (2006.01)
H04L 29/06 (2006.01)
H04L 29/08 (2006.01)
H04W 28/06 (2009.01)

(52) U.S. Cl.
CPC ............ *H04L 69/14* (2013.01); *H04L 67/2833* (2013.01); *H04L 67/2828* (2013.01); *H04L 67/2823* (2013.01); *H04W 28/06* (2013.01); *H04L 69/162* (2013.01)

(58) Field of Classification Search
CPC ............ H04L 67/2823; H04L 67/2828; H04L 67/2833
USPC ......... 370/252, 389, 401–402, 351–356, 474; 709/227, 228, 231
See application file for complete search history.

(56) References Cited

U.S. PATENT DOCUMENTS

| | | | |
|---|---|---|---|
| 6,721,334 B1 * | 4/2004 | Ketcham | 370/473 |
| 7,602,725 B2 * | 10/2009 | Vaught | 370/236.2 |
| 8,004,971 B1 * | 8/2011 | Szabo et al. | 370/230 |
| 2002/0002603 A1 * | 1/2002 | Vange | 709/219 |
| 2004/0202109 A1 * | 10/2004 | Akiyama et al. | 370/235 |
| 2006/0026290 A1 | 2/2006 | Pulito et al. | |
| 2008/0114882 A1 | 5/2008 | Christenson | |
| 2009/0219849 A1 * | 9/2009 | Alpert et al. | 370/312 |

(Continued)

OTHER PUBLICATIONS

International Search Report dated Jun. 12, 2010 for Application No. PCT/IB2010/001195.

(Continued)

*Primary Examiner* — Aftab Nasir Khan
(74) *Attorney, Agent, or Firm* — Frost Brown Todd LLC (57) ABSTRACT

Data communication system between a wireless mobile device (10), and remote servers (30) connected to the Internet the mobile device having client applications (3), comprising a host server (20) interposed between the client applications (3) and the remote servers (30), a communication channel (4) based on a TCP tunnel and/or UDP protocol between the mobile device and the host server (20), on which are transmitted uplink and downlink data messages, the communication tunnel (4) being connected to a first data concentrator module (1) belonging to the mobile device, and to a second data concentrator module (2) belonging to the host server.

14 Claims, 5 Drawing Sheets

(56) References Cited

U.S. PATENT DOCUMENTS

| | | | |
|---|---|---|---|
| 2009/0222578 A1* | 9/2009 | Schneider | 709/238 |
| 2009/0327523 A1* | 12/2009 | Bannoura et al. | 709/247 |
| 2010/0198979 A1* | 8/2010 | Pickens et al. | 709/231 |
| 2010/0248772 A1* | 9/2010 | Denman et al. | 455/518 |
| 2011/0207436 A1* | 8/2011 | van Gent et al. | 455/413 |
| 2013/0311594 A1* | 11/2013 | Luna et al. | 709/213 |

OTHER PUBLICATIONS

Shneyderman, A., et al., "Mobile VPNS for Next Generation GPRS and UMJS Networks", Jan. 1, 2000, White Paper Lucent Technologies, Inc.

* cited by examiner

DATA COMMUNICATION SYSTEM AND METHOD

FIELD OF THE INVENTION

The present invention concerns communication systems between mobile devices and internet servers.

BACKGROUND OF THE INVENTION

More precisely, the present invention concerns a data communication system, adapted to handle data communication between at least a remote server connected to the Internet and a mobile device connected to a wireless network, via a host server connected to the Internet and functionally interposed between said client application and said remote server, and a communication tunnel between the mobile device and the host server.

Such a data communication system is known from document U.S. Pat. No. 7,536,720. However, there is a need to further optimize said communication tunnel, knowing the data rate limitations on the wireless interface.

SUMMARY OF THE INVENTION

To this end, the present invention discloses a data communication system, adapted to handle data communication between at least a remote server connected to the Internet and a mobile device connected to a wireless network, said mobile device comprising at least a client application, wherein said data communication system comprises:
- at least a host server connected to the Internet and functionally interposed between said client application and said remote server,
- a communication channel between the mobile device and the host server, wherein the client application is able to transmit uplink data messages to the host server through the communication channel, and able to receive downlink data messages from the host server through the communication channel,
- a first data concentrator module belonging to the mobile device, interfacing said at least client application, said first data concentrator module adapted to aggregate the uplink data messages into at least a uplink compressed data structure and to transmit said uplink compressed data structure to said host server,
- a second data concentrator module belonging to the host server, adapted to receive the uplink compressed data structure from said mobile device, and adapted to split the uplink compressed data structure into the uplink internet messages corresponding functionally to said uplink data messages and forward the uplink internet messages toward the relevant remote server.

Thanks to these dispositions, the flow of data transmitted trough the channel is optimized regarding the limited data rate of the wireless communication, in particular in the case a GPRS-type wireless link, with regard to the higher data rates prevailing in the Internet.

In various embodiments of the invention, one may possibly have recourse in addition to one and/or other of the following arrangements:
- the second data concentrator module is adapted to receive downlink internet messages from the remote server, further adapted to aggregate the downlink internet messages into a downlink compressed data structure, and to transmit said downlink compressed data structure toward the mobile device,
- the first data concentrator module is adapted to receive the downlink compressed data structure and split the downlink compressed data structure into downlink data messages and forward said downlink data messages toward the client application;
- the communication channel comprises a single TCP/IP-based tunnel, comprising only first and second TCP sockets, said first TCP socket being allocated to the mobile device and said second TCP socket being allocated to the host server, said first and second TCP sockets being connected together by said TCP/IP-based tunnel;
- said communication channel is further adapted to handle UDP datagrams;
- the remote server is a content provider server, wherein said at least some of the uplink data messages are client application requests, wherein said at least some of downlink data messages are server responses, said responses being responsive to said requests;
- the mobile device comprises a plurality of client applications;
- the data communication system as defined above comprises a plurality of remote servers;
- the data communication system as defined above comprises a plurality of host servers;
- the first data concentrator module is further adapted to compress uplink data messages into the uplink compressed data structure, and said second data concentrator module is further adapted to uncompress and split the uplink compressed data structure into said uplink internet messages;
- the second data concentrator module is further adapted to compress downlink data messages into the downlink compressed data structure, and said first data concentrator module is further adapted to uncompress and split the downlink compressed data structure into downlink data messages;
- the TCP/IP-based tunnel is permanently established as long as the mobile device is supplied and connected to said wireless network;
- the mobile device and the at least remote server, wherein the remote server is to handle primary downlink internet messages, wherein the remote server includes a content adapter module adapted to filter primary downlink internet messages and extract relevant downlink internet messages from said primary downlink data messages;

The invention also concerns a method of handling data communication between a mobile device connected to a wireless network, and at least a remote server connected to the Internet, wherein said mobile device comprises at least a client application,
said data communication system comprising:
at least a host server connected to the Internet and functionally interposed between said client application and said remote server,
a communication channel between the mobile device and the host server,
wherein the method comprises an uplink transmission and/or a downlink transmission,
wherein the uplink transmission comprises the steps of:
a. on the mobile device side, receiving uplink data messages from the client application, aggregating the uplink data messages into a uplink compressed data structure,
b. on the mobile device side, transmitting said uplink compressed data structure to the host server through said communication channel, c. on the host server side, splitting the uplink compressed data structure into the uplink internet messages, and forwarding uplink internet messages corresponding functionally to said uplink data messages to the relevant remote server on the Internet, wherein the downlink transmission comprises the steps of:

d. on the host server side, receiving downlink internet messages from the remote server, e. on the host server side, aggregating the downlink internet messages into a downlink compressed data structure and transmitting said downlink compressed data structure to the mobile device through said communication channel, f. on the mobile device side, splitting the downlink compressed data structure into the downlink data messages and transferring the downlink data messages to the relevant client application;

In addition, one may possibly have recourse to one and/or other of the following arrangements:

the method comprises an uplink transmission and a downlink transmission wherein the downlink transmission is responsive to the uplink transmission;

the single communication tunnel comprises a single TCP/IP-based tunnel, wherein said method further comprises a preliminary step of opening a single TCP socket on the mobile device side, and establishing a TCP-based tunnel between the mobile device and a single TCP socket on the host server;

said communication channel comprises a single TCP/IP-based tunnel and is further adapted to handle UDP datagrams, wherein said uplink and downlink compressed data structure are transmitted through the communication channel, wherein said method comprises the steps of, for each uplink and downlink compressed data structure to be sent:

deciding, according to a set of predefined criteria, to select either a TCP/IP message or a UDP datagram to send said uplink and downlink compressed data structure according to a set of predefined criteria, sending said uplink and downlink compressed data structure as a TCP/IP message or a UDP datagram, according to selection made;

the method comprises further comprises the step of maintaining the communication tunnel between the mobile device and the host server, by periodically transmitting 'keep-alive' messages into the tunnel, in the case of absence of data traffic;

the method comprises further comprises the step of, on the host server side, filtering primary downlink data messages and extract relevant downlink data messages from primary downlink data messages;

the data communication system further comprise at least an auxiliary mobile device connected to the mobile device 10, and wherein said mobile device comprises client application in connection with the auxiliary mobile device.

The invention also concerns a mobile device comprising at least a client application and a first data concentrator module as defined above.

The invention also concerns a host server comprising at least a second data concentrator module as defined above.

BRIEF DESCRIPTION OF THE DRAWINGS

Other features and advantages of the invention appear from the following detailed description of one of its embodiments, given by way of non-limiting example, and with reference to the accompanying drawings.

In the drawings.

MORE DETAILED DESCRIPTION OF THE INVENTION

In the figures, the same references denote identical or similar elements.

Figure 1:
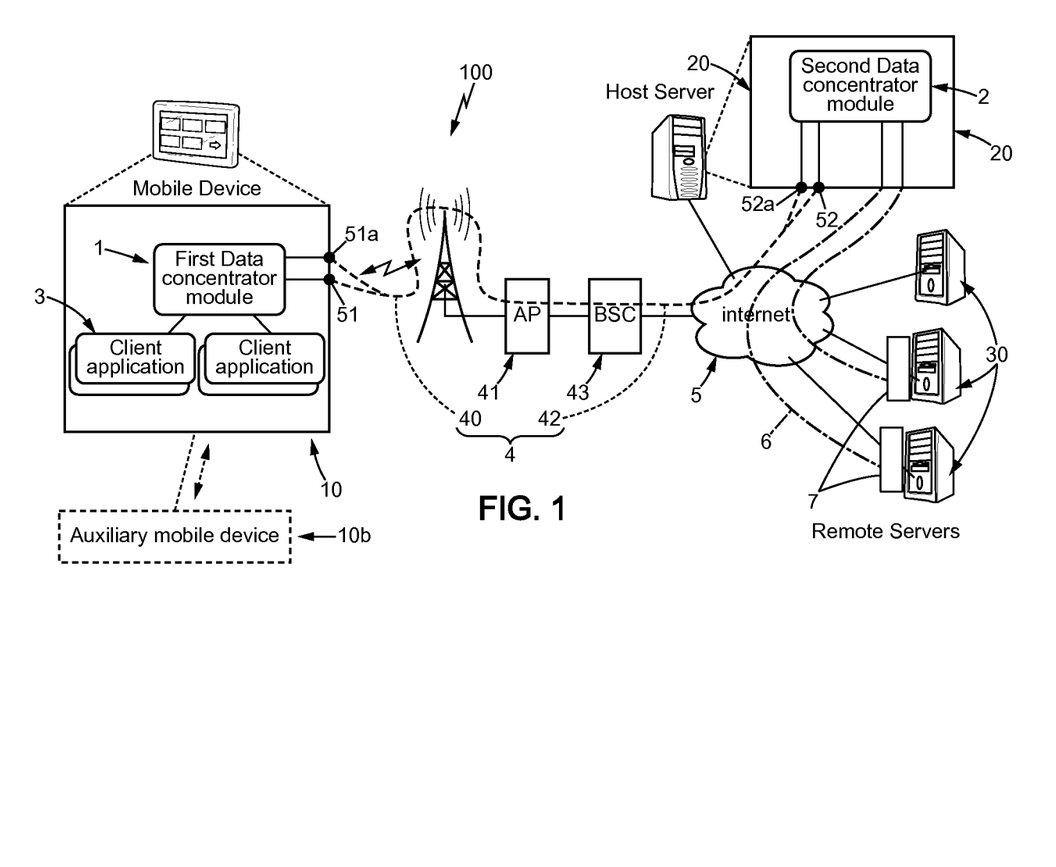
FIG. 1 is a schematic view of the data communication system according to the invention.

FIG. 1 shows the data communication system 100 according to the invention, comprising at least a mobile device 10, and at least a remote server 30 able to communicate together through a host server 20. Said host server 20 is functionally interposed between the mobile device 10 and one or several remote servers 30 connected to the Internet 5.

Said mobile device 10 may be for example a Personal Navigation Device ('PND'), or a smart phone; said mobile device 10 may be typically used in a vehicle, but can also be used by a pedestrian, a cyclist, or any transportation means.

Said mobile device 10 comprises a first data concentrator module 1 designed to be the communication handling unit for the mobile device relative to the host server 20. The host server 20 comprises a second data concentrator module 2 designed to be the communication handling unit for the host server 20 relative to the mobile device 10, acting as a counterpart to the first data concentrator module 1.

A communication link can be established between said first and second data concentrator modules 1,2, and advantageously, this communication link is designed as a communication channel 4. This communication channel 4 includes a wireless network portion 40 between the mobile device 10 and an access point 41, and a wired portion 42 between the wireless access point 41 and the host server 20. The wired portion may comprise one or several intermediate management units 43, like one or several Base Station Controllers, in charge of the global management of the wireless network, such intermediate unit(s) may include a Network Address Translator (NAT) which is thus traversed by said communication channel 4. The wired portion also includes an Internet portion, as well known in the art.

The wireless portion 40 can be a GSM, GPRS, CDMA UMTS, WiFi, 802.11x or any other wireless known protocol in the art.

The communication channel 4 comprises a first termination on the mobile device side, designed as a first connection port 51, and a second termination on the host server side, designed as a second connection port 52. Advantageously according to the invention, the communication comprises a single TCP/IP tunnel 4, in which each of the first and second connection ports 51,52 can be defined as a 'socket'.

Additionally to this single TCP/IP tunnel 4, the communication may comprise UDP datagrams (UDP standing for 'User Datagram Protocol') using first and second auxiliary connection ports 51a, 52a, UDP datagrams requiring less transmission overhead. The decision to use either TCP/IP messages or UDP datagrams will be explained later.

Further, the mobile device 10 comprises one or several client applications 3 which require communication with the host server 20 or with the remote servers 30. As a non limitative list of examples, such client applications can include:

tracking report application (reporting the successive geographic locations of the mobile device to the host server), road traffic conditions display update (receiving and updating the traffic jams, road works, average speeds per segment, etc.), weather short-term forecast (requiring and displaying weather short-term forecast linked to the current location of the mobile device), telephone directories (yellow pages, social networks, . . . ), road speed control locations, instant messaging, road services (parking lots, gas stations, . . . ).

Such client applications 3 simultaneously run on the mobile device 10, some of them being the result of a user's action, other ones being automatically activated.

Some of the client applications 3 operate on a 'Push' mode, i.e., they periodically send information to a remote server, without necessarily being required to do so. Some other client applications 3 operate on a conventional 'client-server' mode, i.e., they post a request toward a remote server and wait for an answer. In any case, as explained above, the flows of information go through the host server 20. Information sent by the mobile device 10 to the host server 20 comprises messages referred to as 'uplink flow', whereas information sent by the host server 20 to the mobile device 10 comprises messages referred to as 'downlink flow'.

Moreover, when the mobile device 10 is used in a complex vehicle like an articulated truck, the mobile device 10 is typically installed in the tractor, and it may be complemented by an auxiliary mobile device 10b located in the trailer or on the trailer. In such a case, the auxiliary mobile device 10b communicates with the mobile device 10 (wirelessly or via a physical connection), the auxiliary mobile device 10b playing the role of a satellite relative to the mobile device 10. Hence some of the client applications 3 comprised in the mobile device 10 may be the image of a client application supported in the auxiliary mobile device 10b.

Figure 2:
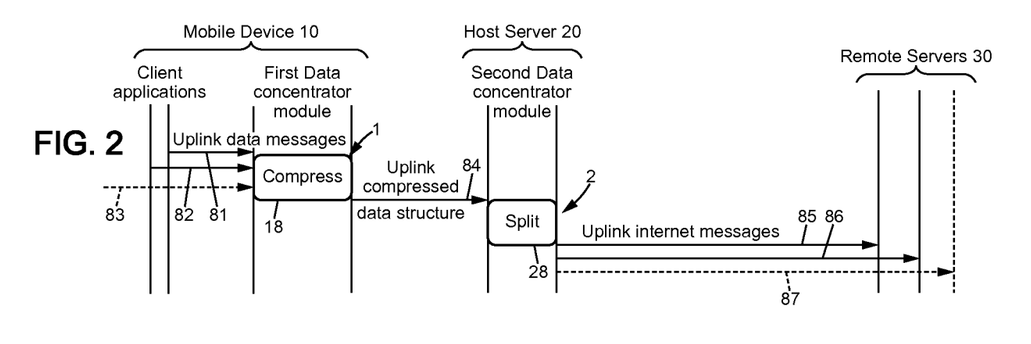
FIG. 2 is a time diagram of the uplink data transmission of the data communication system of FIG. 1.

Turning now to FIG. 2, the optimization taking place in the communication channel 4 will be explained. This optimization is intended to minimize the use of the wireless portion 40 since the data rate of this portion is usually limited and since the cost of use of this wireless portion is generally volume-dependant.

Each of the client applications 3 generate and output data message(s) (request(s) and/or report(s)) to be transmitted to the host server or to a remote sever, these request(s) and/or report(s) will be named 'uplink data messages' 81,82,83 in the following. It should be noted that some of the 'uplink data messages' may be issued by the auxiliary mobile device 10b as explained above. One particular type of uplink data message is a report of the tracking type generated by a tracking report application.

The first data concentrator module 1 receives the uplink data messages 81,82,83 from client applications 3 and gathers the various uplink data messages to be sent out and available at a certain time within the mobile device.

The first data concentrator module 1 then aggregates the various uplink data messages 81,82,83 into a single 'uplink compressed data structure' 84. This aggregation step (reference 18 in FIG. 2) includes the operation of appending each individual message together with its own dedicated identifier, named 'service identifier' or 'ServiceId' in the following. The result of this appending process constitutes a single data structure, named 'uplink compressed data structure', that will be sent as one packet.

This aggregation step 18 may also include a compression operation, a multiplexing process or a clumping process as it will be discussed in details further.

The first data concentrator module 1 then transmits the resulting compressed structure 84 to the second data concentrator module 2 belonging to the host server 20. Said second data concentrator module 2 is a communication counterpart of the first data concentrator module 1. Said second data concentrator module 2 is adapted to receive the 'uplink compressed data structure' 84, further adapted to split said data structure into individual messages, said split operation 28 being substantially the reverse of the aggregation operation described above.

After the split operation 28, for each uplink data message (issued originally from client applications 3) said second data concentrator module 2 generates an uplink internet message 85,86,87 on the internet 5 toward the relevant remote server 30. Said uplink internet message 85,86,87 corresponds functionally to the uplink data message 81,82,83 issued originally from client applications 3. However, the uplink internet message is such that it can be understood by a public domain server 30, and in practice the uplink internet message 85,86, 87 is a request encapsulated in a http request transmitted on the internet through the well known TCP/IP protocol, this http request including if necessary a payload with request parameters as url parameters or json (JavaScript Object Notation) parameters.

More particularly, the second data concentrator module 2 determines which server is relevant according to a list of pre-registered target servers stored in the host server 20. According to the 'ServiceId' associated with each uplink data message 81,82,83, the second data concentrator module 2 identifies the relevant target server 30 to be addressed for the considered service, thanks to a correspondence table stored in its memory.

Hence, the mobile device 10 does not require knowing all the data relative to the internet remote servers (host, port, time-outs, url, etc. . . . ), but needs only to refer to the 'service identifier'. Further, in some cases, the mobile device 10 may also use a simplified uplink data message, which is functionally complemented by the second data concentrator module 2 prior to transmission to the relevant remote server 30.

More specifically about the correspondence tables stored in the host server 20 memory, on the one hand, each Service Id is in logical relation with a target server, and on the other hand, each target server is associated with a set of connection parameters (host, port, time-outs, url or IP addresses, various dynamic properties, etc. . . . ). These correspondence tables are updated when necessary by a network manager or by a third party service provider.

As a result, after identifying the relevant target server 30 corresponding to the ServiceId, said second data concentrator module 2 builds relevant uplink internet message 85,86,87 in the appropriate format which can be understood by target server 30, usually a http request. The host server 20 thus opens respective server-to-server conventional connections 6 with the relevant target server 30, and each of the uplink internet messages 85,86,87 is then sent to the appropriate remote (target) server 30. Those uplink internet messages 85,86,87 are then received and processed by relevant remote (target) servers 30.

Figure 3:
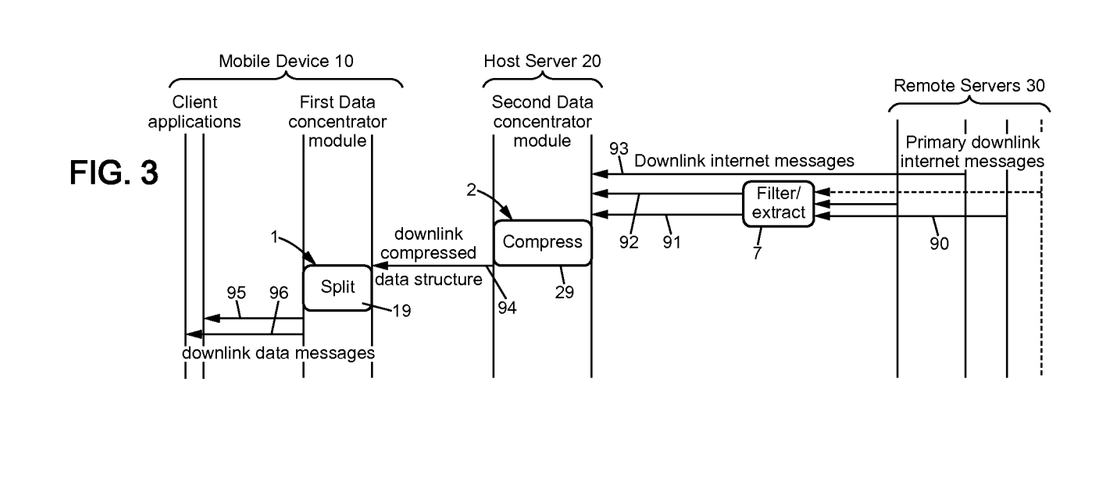
FIG. 3 is a time diagram of the downlink data transmission of the data communication system of FIG. 1.

FIG. 3 shows the downlink flow process. Typically, a primary downlink internet message 90 is issued by a relevant remote server 30, either being a response to a previous request or being an unsolicited 'Push' message.

Commonly used remote servers 30 output messages under 'json', 'xml' formats or the like. However, still pursuing the minimization of the use of the wireless link, and advantageously according to the invention, the content of the text-oriented json, xml formats will be striped to the bare useful content, prior to be transmitted over the wireless network. This operation is performed by a 'content adapter module' 7, which filter and extract relevant useful information from the text-oriented server output, as it will be described in details later (see FIG. 8). Preferably, this content adapter 7 is located in the content provider server 30, but this content adapter 7 can be located in another server or even within the host server 20.

Said 'content adapter module' 7 then sends the useful information as a downlink internet message 91 to the host server 20, and more precisely to the second data concentrator module 2. In some case, the content adapter module 7 may not be involved, and the internet message 93 issued by the target server 30 is sent directly to the host server 20 and more precisely to the second data concentrator module 2.

Said second data concentrator module 2 receives and gathers said downlink internet messages 91,92,93 and then performs an aggregation operation 29 by appending the content of the various downlink internet messages 91,92,93 into a single downlink compressed data structure 94. For each downlink internet message, a field with the relevant ServiceId is added for further downlink processing. Said downlink internet messages 91,92,93 may also comprise one or several functional acknowledgment(s) ('ACK') of uplink previous transmission(s). This single downlink compressed data structure 94 is then sent to the mobile device 10 and more precisely to the first data concentrator module 1.

The first data concentrator module 1, after receiving the downlink compressed data structure 94, performs a split operation 19, thereby splitting this data structure 94 into individuals downlink data message 95,96. According to the 'ServiceId' identified in downlink data messages 95,96, each downlink data message 95,96 is forwarded to the relevant client application 3 that originally required such a service.

Figure 4:
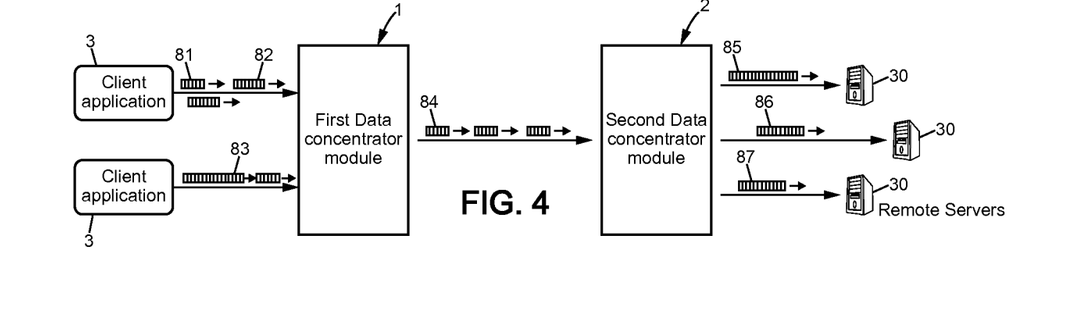
FIG. 4 is a schematic diagram of the uplink flow and protocol optimization of the data communication system of FIG. 1.
Figure 5:
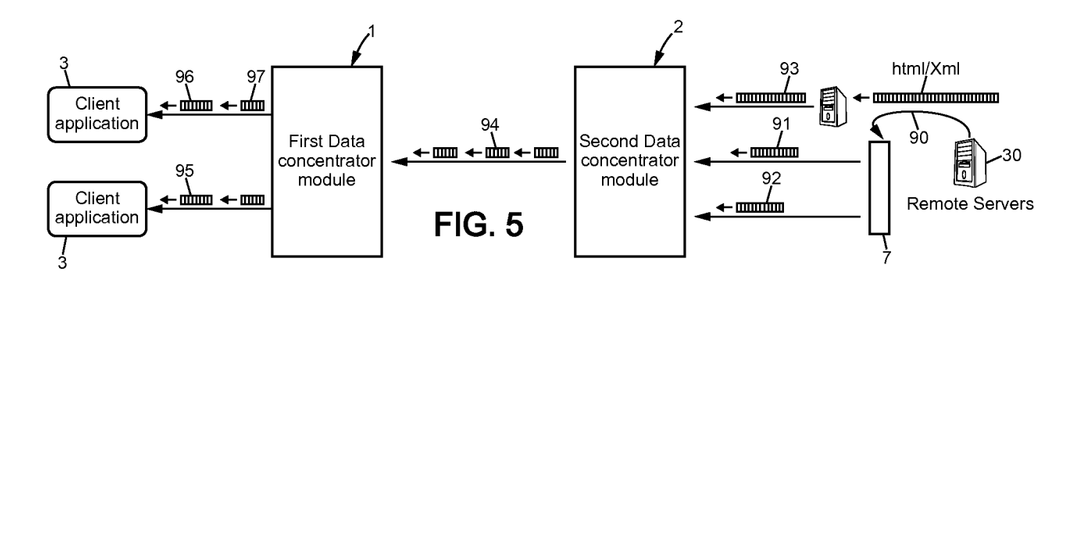
FIG. 5 is a schematic diagram of the downlink flow and protocol optimization of the data communication system of FIG. 1.

FIGS. 4 and 5 shows more specifically how the first and second data concentrator module 1,2 handle the aggregation and split operations, using appending process and preferably but not necessarily also a multiplexing process, and/or a clumping process and/or a compression process as defined below.

Application Multiplexing

Each client application 3 uses a unique service identifier to identify itself and to be recognized by the host server 20.

An exemplary uplink data message 81 comprises:
Field 1.1: a Service Id
Field 1.2: a sequential number message identifier also named 'tmpid' or 'TmpSeqNb'
Field 1.3: a payload which contains the service parameters
For example: the payload may contain the current location of the mobile device and a service requirement.

Other exemplary uplink data message 82,83 are also received by the first data concentrator module 1. An exemplary uplink data message 82 comprises:

Field 2.1: a Service Id
Field 2.2: a sequential number message identifier ('tmpid' different from field 1.2)
Field 2.3: a payload which contains the service parameters
An exemplary uplink data message 83 comprises:
Field 3.1: Service Id
Field 3.2: sequential number message identifier 'tmpid' ('tmpid' different from fields 1.2 and 2.2)
Field 3.3: payload.

The aggregation step 18 is performed to result in the following uplink compressed data structure 84:
1: Field 1.1: Service Id
2: Field 1.2: sequential number
3: Field 1.3: payload
4: Field 2.1: Service Id
5: Field 2.2: sequential number
6: Field 2.3: payload
7: Field 3.1: Service Id
8: Field 3.2: sequential number
9: Field 3.3: payload This compressed data structure 84 is complemented by one header and one CRC (Cyclic Redundancy Check), those header and CRC being common to the three original data messages 81,82,83, thereby optimizing the necessary size of the transmission.

Although described with an example of 3 messages, it should be understood that any number of messages is encompassed within the scope of this specification. However, particularly in the case a UDP datagrams are used, the aggregation process may take into account a predefined limit which is slightly below what is known in the art as the Maximum Transfer Unit ('MTU') which usually set to 1500 bytes, and consequently the number of uplink data messages 81,82,83 aggregated in the uplink compressed data structure 84 is calculated in such a way that the resulting size of the uplink compressed data structure 84 is below said predefined limit.

Clumping/Naggling

From another point of view, another method used is the clumping (also known as naggling) process, known in the art, which consists in waiting for a certain time to group together the messages to be sent, issued within a period of time. If a certain time has passed, even though only few messages have been received at the first data concentrator module 1 and the limit size is not reached, the aggregation process is undertaken and the output sent immediately, in order not to delay too much the pending messages. This maximum time to wait is a parameter of the first data concentrator module 1, governed by the naggling algorithm as known in the art.

Compression

Further, according to another aspect of the invention, various compression methods may be implemented.

A first compression process can be used at the data content level, in which relative information are used instead of absolute information. The tracking information relies basically on 3 fields of data: Timestamp, latitude, longitude, and according to the invention these 3 fields can be defined as absolute or relative, with the corresponding field size as shown in the following table:

|  | Absolute | Relative |
|---|---|---|
| Time Stamp | 4 bytes<br>range: [0 . . . 4294967295] | 2 bytes<br>range: [0 . . . 65535] |
| Latitude | 4 bytes<br>range: [−9000000 . . . 9000000] | 2 bytes<br>range: [−32768 . . . 32767] |
| Longitude | 4 bytes<br>range: [−9000000 . . . 9000000] | 2 bytes<br>range: [−32768 . . . 32767] |

A dynamic size encoding as known in the art can further reduce the byte size of each field, according to the actual value present in such field.

As shown in the table, the transmission of a relative tracking data requires 6 bytes, whereas the transmission of an absolute tracking data requires 12 bytes. Therefore, the mobile device 10 will send from time to time an absolute tracking report, while most of the time the mobile device 10 will send relative tracking reports, thus saving payload. The rule to send absolute instead of relative tracking reports may depend upon configuration parameters, upon connection set-up, or upon how much the location has changed, as non limitative examples.

A second compression process is applied at the data link layer level. A first example is a BER-encoding (Basic Encoding Rule) method in which each data element is encoded as a type identifier (also named 'tag'), a length description, the actual data elements. These types of encodings are commonly called type-length-value or 'TLV' encodings. A further optimization of such BER-encoding is known as 'UPER' encoding, in which tags are omitted when data element type is implicit, in which the alignment process works at the bit level (a Boolean occupies only one bit whereas it occupies one byte for byte-aligned common protocols), in which strings and numbers are packed more tightly if their value range are limited (for example, text identifiers limited to the 26 lower-case letters plus 'underscore' key would only take 5 bits per character).

A third compression process may also be applied to the whole payload. The whole payload is compressed by a 'zip' operation as well known in data processing. If the zipped result exhibits a smaller size, then the zipped payload is transmitted with a 'zip' tag.

Still referring to the example described above, illustrated in FIG. 4, the second data concentrator module 2 receives and processes the uplink compressed data structure 84. The process may include uncompress and split operations as described hereafter.

Uncompress

More precisely, the second data concentrator module 2 has to undo the compression operations performed in the first data concentrator module 1 explained above, in particular by 'unzipping' payload if necessary, decoding BER or UPER encoded data according to a commonly shared grammar.

Split

Then, the split operation is performed in which the uncompressed data structure 84 is torn down to messages corresponding functionally to original uplink data messages 81,82, 83.

The message corresponding to the first message comprises:
Field 1.1: Service Id
Field 1.2: sequential number
Field 1.3: payload According to the Service Id, and with the help of the above described correspondence tables, the host server identifies the coordinates of the relevant target serve and elaborates an uplink internet message 85 which can be understood by the relevant remote server 30. An exemplary content of such an uplink internet message 85 is as follows in a http request:

"GET/weather/main/dummyclient/sandbox/dummymodid/123456789/
?city=paris&forcast=today HTTP/1.1
Host : Localhost
User-Agent : mdi binaryserver
Accept-Encoding : gzip,deflate
Keep-Alive : 300
Connection : Keep-Alive"

A similar treatment is also applied regarding other uplink internet message 86,87.

The host server 20 uses a client-server connection to send theses uplink internet messages 85,86,87 to respective target servers 30.

To establish the server-to-server connection, the host server uses the following configuration:

| | |
|---|---|
| Channel | \| 8 |
| Action | \| request |
| Host | \| localhost |
| Port | \| 8080 |
| Path | \| /weather/main/%client%/%senv%/%modid%/%unitid%/ |
| Protocol | \| httpget |
| Prottimeout | \| 60 |
| Msgtimeout | \| 1 |

Further, the host server 20 records the ServiceId associated with each respective connection.

In response to a http service request, the relevant remote server 30 returns an http response (named here 'primary downlink internet message' 90) with a service-defined format, usually a json (or xml or the like) file, as the example shown below:

"HTTP/1.x 200 OK
Server: Apache/2.2.9 (Debia) PHP/5.2.6-1 leny3 with A-Patch
Etag: "ef2fbbacdde87b79910da97115ec0f" -gzip
Vary: Accept-Encoding
Content-Encoding : gzip
Content-Type: application/json; charset=utf-8
Content-Length: 380
Date : Mon, 14 Dec 2009 13 :02 :32 GMT
{"location"="Paris","lat"=42,"long"=41,
'forecast' :[{"date":"today","value":"sunny"}]}"

Figure 8:
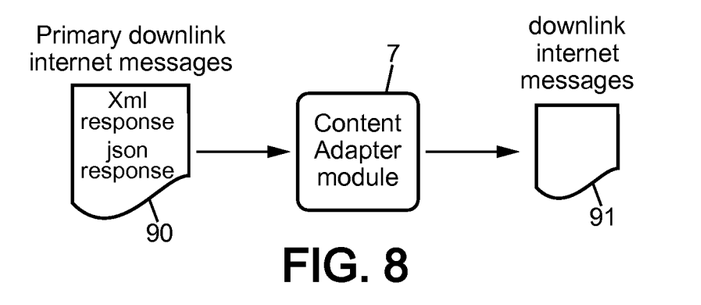
FIG. 8 shows the content adapter module.

This primary downlink internet message 90 is then processed through the content adaptor module 7 (as illustrated in FIG. 8) in order to get rid of all unnecessary or useless information regarding the mobile device 10. The output of this process (also known as 'Filter/Extract') is given in the downlink internet message 91, in which are kept only:
200sunny The serviceId is appended to the filtered/extracted result, in order to be sent back to the client application 3 that initially required such a service.

As shown in FIG. 5, this downlink internet message 91 enters the second data concentrator module 2, together with other similar downlink internet messages 92,93, some of them (ref 93) may not be processed in a content adaptor module 7 in the remote server 30, but the tear-down process can also be performed within the host server 20 for some services.

The second data concentrator module 2 then aggregates various downlink internet messages 91,92,93 in a way similar to what was explained above in the sections about 'Application Multiplexing', 'Clumping', 'Compression' concerning the first data concentrator module 1, thus not repeated in details here.

A resulting downlink compressed data structure 94 is then sent by the second data concentrator module 2 to the first data concentrator module 1.

At this point, said first data concentrator module 1 processes the downlink compressed data structure 94, by uncompressing and then splitting said structure to recover the individuals downlink data messages 95,96,97 to be sent to the relevant client applications 3 in the mobile device 10. The uncompress and split operations are similar to what was described for the second data concentrator module 2 relative to FIG. 4 above (see 'Uncompress' and 'Split' sections), and thus not repeated in details here.

The result of the uncompress and the split operation are the individuals data messages 95,96,97 directly understandable by client applications 3.

Still referring to FIGS. 2-5, according to the invention, the communication channel 4 comprises a single TCP/IP communication tunnel 4. Preferably it further comprises a UDP datagram channel. The decision to send uplink and downlink compressed data structure 84,94, either as a TCP message or as a UDP datagram is taken according to a set of predefined criteria, these set of predefined criteria comprising several parameters, in particular:

the size of the uplink and downlink compressed data structure 84,94, as already explained: if the size of the uplink and downlink compressed data structure 84,94, is above the predefined size limit, then a TCP message is used to benefit from the TCP underlying transport layers, any other criteria based on the possibility to know the public IP address of the destination entity to which the message/datagram is to be sent.

Figure 6:
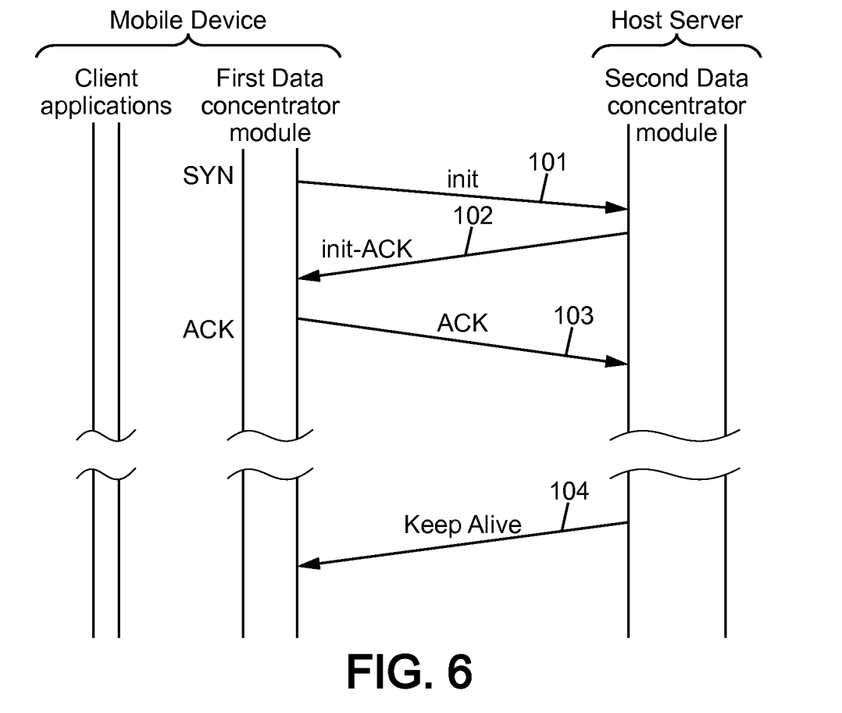
FIG. 6 is a time diagram of the communication tunnel management.

FIG. 6 shows how the communication channel 4 is established, which may be in particular a TCP/IP communication tunnel 4. In order to avoid bulky communication overheads, the communication tunnel 4, once established, is maintained as long as the mobile device 10 is within the covered area of the wireless network. Therefore, the various messages necessary to establish the communication link and to free said communication link are saved.

Referring to FIG. 6, one of the applicants, for example the mobile device 10, wants to establish a connexion with another party; to this end it sends an initialisation message 'init' 101 with a sequence number to a third party, in this case the third party is the host server 20. The host server 20, in response to this initialisation message, sends an acknowledge 102 with another sequence number. Then a third message 103 is transmitted from the mobile device, which acknowledges this second sequence number. The normal release of a TCP/IP connection also requires a number of similar messages which number amounts to 4. It is therefore an advantage of the invention to avoid the burden of establishing and switching off the TCP/IP connection each time a communication is required.

Advantageously according to the invention, as long as the mobile 10 is within reach of the wireless network, the communication tunnel 4 is maintained opened, in particular if no communication traffic is functionally required between the mobile device and the host server 20.

To this end, when data traffic is absent for a certain time, the communication tunnel 4 is preserved by the host server 20 which periodically sends 'keep alive' messages 104, which sole purpose is to maintain opened the communication channel 4 and to avoid the lapse of time-outs.

Figure 7:
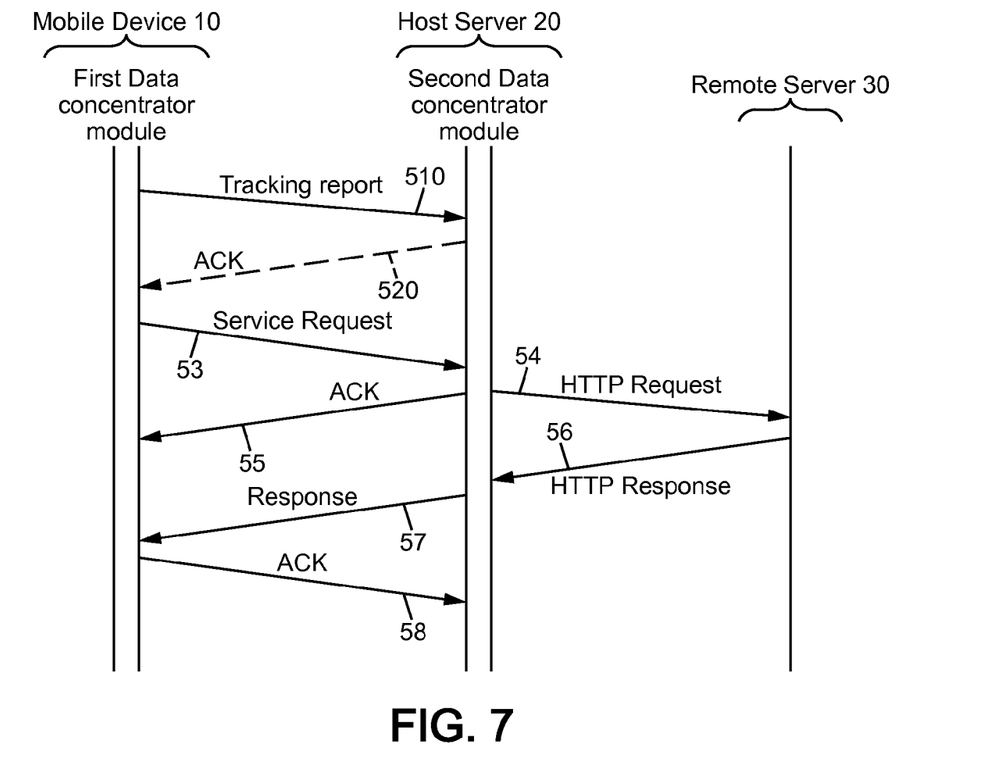
FIG. 7 is a time diagram the exchanges of messages and acknowledgements.

Turning now to the time diagram shown in FIG. 7, more details are described in relation with the different exchanges of messages between the mobile device 10, the host server 20 and the remote server 30, in particular regarding the process of acknowledgment of these messages.

A first message 510 is sent from the mobile device 10 to the host server 20. This message is a tracking report in the example, and does not require to be forwarded to a remote server. In response, the host server 20 returns an 'Ack' 520 to acknowledge the reception of the first message 510.

It should be noted the first message 510 may be part of an uplink compressed data structure 84 as described above.

Similarly, the 'Ack' 520 is also preferably included in a downlink compressed data structure 94, in order to limit the protocol overhead.

Still referring to FIG. 7, a second message 53 is sent from the mobile device 10 to the host server 20, this message requiring a service from a remote server 30. In reaction, the host server forward a http request 54 on the internet as explained in details above, and the host server 20 returns an 'Ack' 55 to acknowledge the reception of the second message 53.

After receiving the response 56 from the remote server, the host server forward a corresponding response 57 to the mobile device 10 as explained in details above. Then mobile device 10 acknowledges this reception via a 'Ack' message 58.

The 'Ack' messages 55,58 contains the sequential number 'tmpid' that was sent in the corresponding respective message 53,57 so the 'Ack' always refers to a precisely identified message. However, the Ack 520 sent in reaction to the tracking report 510 does not require a 'tmpid' as this kind of tracking reports are serialized.

Again, of course, all the messages exchanged between the mobile device 10 and the host server 20 and in particular the 'Ack' messages may be part of uplink compressed data structures 84 or downlink compressed data structures 94.

It should be noted that some server 30 may want to subscribe to some service available on the mobile device 10 via the host server. In this case, said remote server 30 may use an XMPP message to the host server 20.

The invention claimed is:

1. A data communication system, adapted to handle data communication between at least a public domain remote server connected to Internet and a mobile device connected to a wireless network, said mobile device comprising a plurality of client applications, wherein said data communication system comprises:

at least a host server having a memory connected to the Internet and functionally interposed between said client applications and said public domain remote server, a communication channel between the mobile device and the host server, wherein the client applications are able to transmit uplink data messages to the host server through the communication channel, and able to receive downlink data messages from the host server through the communication channel, each uplink message being labeled by a simple ServiceId identifier, wherein said communication channel comprises a single TCP/IP-based tunnel, comprising only first and second TCP sockets, said first TCP socket being allocated to the mobile device and said second TCP socket being allocated to the host server, said first and second TCP sockets being connected together by said TCP/IP-based tunnel;

a first data concentrator module belonging to the mobile device, interfacing said at least one client application, said first data concentrator module adapted to aggregate the uplink data messages into at least an uplink compressed data structure and to transmit said uplink compressed data structure to said host server, a second data concentrator module belonging to the host server, adapted to receive the uplink compressed data structure from said mobile device, and adapted to split the uplink compressed data structure into uplink internet messages corresponding functionally to said uplink data messages, each uplink internet message being encapsulated in a HTTP request and forward each of the HTTP request toward a relevant public domain remote server according to the simple ServiceId identifier of the uplink message, wherein said communication channel includes a wireless network portion, wherein said first data concentrator module is further adapted to compress uplink data messages into the uplink compressed data structure, and said second data concentrator module is further adapted to uncompress and split the uplink compressed data structure into said uplink internet messages, wherein the second data concentrator module is adapted to receive downlink internet messages from the public domain remote server, further adapted to filter the content of the received downlink internet messages and further adapted to aggregate the filtered downlink internet messages into a downlink compressed data structure, and to transmit said downlink compressed data structure toward the mobile device, wherein the first data concentrator module is adapted to receive the downlink compressed data structure and split said downlink compressed data structure into downlink data messages and forward said downlink data messages toward the client applications, wherein said second data concentrator module is further adapted to compress downlink internet messages into the downlink compressed data structure, and said first data concentrator module is further adapted to uncompress and split the downlink compressed data structure into downlink data messages.

2. The data communication system according to claim 1, wherein said communication channel is further adapted to handle UDP datagrams.

3. The data communication system according to claim 1, wherein said public domain remote server is a content provider server, wherein said at least some of the uplink data messages are said client applications requests, wherein said at least some of downlink data messages are public domain server responses, said responses being responsive to said requests.

4. The data communication system according to claim 1, comprising a plurality of public domain remote servers, wherein each of the HTTP request is forwarded toward the most relevant public domain remote server among a list of preregistered public domain servers, according to the simple ServiceId identifier of the uplink message.

5. The data communication system according to claim 1, comprising a plurality of host servers.

6. The data communication system according to claim 1, wherein said TCP/IP-based tunnel is permanently established as long as the mobile device is supplied and connected to said wireless network.

7. The data communication system according to claim 1, further comprising the mobile device and the at least public domain remote server, wherein the public domain remote server is adapted to handle primary downlink internet messages, wherein the public domain remote server or the host server includes a content adapter module adapted to filter primary downlink internet messages and extract relevant downlink internet messages from said primary downlink data messages, wherein the content adapter module is configured to strip the primary downlink internet messages in order to discard all data useless to the mobile device.

8. The data communication system according to claim 7, further comprising at least an auxiliary mobile device connected to the mobile device, and wherein said mobile device comprises a client application of the plurality of client applications in connection with the auxiliary mobile device.

9. A method of handling data communication in a data communication system between a mobile device connected to a wireless network, and at least a public domain remote server connected to Internet, wherein said mobile device comprises a plurality of client applications, said data communication system comprising:
at least a host server having a memory connected to the Internet and functionally interposed between said client applications and said public domain remote server, a communication channel between the mobile device and the host server, said communication channel including a wireless network portion wherein said communication channel comprises a single TCP/IP-based tunnel, comprising only first and second TCP sockets, said first TCP socket being allocated to the mobile device and said second TCP socket being allocated to the host server, said first and second TCP sockets being connected together by said TCP/IP-based tunnel, wherein the method comprises an uplink transmission and a downlink transmission, wherein the uplink transmission comprises the steps of:

a. on the mobile device side, receiving uplink data messages from the client applications, each uplink message being labeled by a simple ServiceId identifier, aggregating the uplink data messages and compressing the result thereof into a uplink compressed data structure, b. on the mobile device side, transmitting said uplink compressed data structure to the host server through said communication channel, c. on the host server side, uncompress and splitting the uplink compressed data structure into an uplink internet messages, and forwarding the uplink internet messages encapsulated in a HTTP request corresponding functionally to said uplink data messages to a relevant public domain remote server on the Internet, according to the simple ServiceId of each uplink message, wherein the downlink transmission comprises the steps of:

d. on the host server side, receiving downlink internet messages from the public domain remote server, e. on the host server side, filtering the content of the received downlink internet messages, aggregating the filtered downlink internet messages and compressing the result thereof into a downlink compressed data structure and transmitting said downlink compressed data structure to the mobile device through said communication channel, f. on the mobile device side, uncompress and splitting the downlink compressed data structure into the downlink internet messages and transferring the downlink internet messages respectively to the relevant client applications.

10. A method of handling data communication according to claim 9, wherein said communication channel comprises the single TCP/IP-based tunnel, wherein said method further comprises a preliminary step of:

opening a single TCP socket on the mobile device side, and establishing a TCP-based tunnel between the mobile device and the single TCP socket on the host server.

11. A method of handling data communication according to claim 9, wherein said communication channel comprises the single TCP/IP-based tunnel and is further adapted to handle UDP datagrams, wherein said uplink and said downlink compressed data structure are transmitted through the communication channel, wherein said method comprises the steps of, for each uplink and downlink compressed data structure to be sent:

deciding, according to a set of predefined criteria, to select either a TCP/IP message or a UDP datagram to send said uplink and downlink compressed data structure according to the set of predefined criteria,     sending said uplink and downlink compressed data structure as the TCP/IP message or the UDP datagram, according to selection made.

12. A method of handling data communication according to claim 9, further comprising the step of:

g. maintaining the communication the single TCP/IP-based tunnel between the mobile device and the host server, by periodically transmitting 'keep-alive' messages into the single TCP/IP-based tunnel, in the case of absence of data traffic.

13. A method of handling data communication according to claim 9 comprising the uplink transmission and the downlink transmission wherein the downlink transmission is responsive to the uplink transmission.

14. A method of handling data communication according to claim 13, further comprising the step of:

on the host server side, filtering primary downlink data messages and extract relevant downlink data messages from primary downlink data messages, wherein a content adapter module is configured to strip the primary downlink internet messages in order to discard all data useless to the mobile device.

* * * * *